US 6,750,960 B2

(12) United States Patent
Bowers

(10) Patent No.: US 6,750,960 B2
(45) Date of Patent: Jun. 15, 2004

(54) OPTICAL DISTANCE MEASUREMENT DEVICE AND METHOD THEREOF

(75) Inventor: Mark W. Bowers, Patterson, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/391,378

(22) Filed: Mar. 17, 2003

(65) Prior Publication Data

US 2003/0184729 A1 Oct. 2, 2003

Related U.S. Application Data

(62) Division of application No. 09/801,144, filed on Mar. 6, 2001, now Pat. No. 6,570,646.

(51) Int. Cl.[7] ............................. G01C 1/00; G01C 3/08; G01B 11/26; G01B 11/24; G01B 11/30
(52) U.S. Cl. .................... 356/141.4; 356/5.1; 356/5.11; 356/601
(58) Field of Search .............................. 356/140–141.4, 356/5.09, 5.1, 5.11, 5.15, 28, 629, 627, 601; 250/334

(56) References Cited

U.S. PATENT DOCUMENTS

| 4,401,886 | A | * | 8/1983 | Pond et al. ............... 250/203.1 |
| 4,477,184 | A | * | 10/1984 | Endo ....................... 356/141.1 |
| 4,516,853 | A | * | 5/1985 | Pearson ................. 356/139.08 |
| 4,602,852 | A | * | 7/1986 | Moroz ........................ 359/311 |
| 4,621,926 | A | | 11/1986 | Merry et al. ................. 356/363 |
| 4,650,330 | A | * | 3/1987 | Fujita .......................... 356/489 |
| 4,687,326 | A | * | 8/1987 | Corby, Jr. ................... 356/5.01 |
| 4,700,045 | A | | 10/1987 | Merry et al. ................. 219/121 |
| 4,790,651 | A | | 12/1988 | Brown et al. ................. 356/4.5 |
| 4,907,863 | A | | 3/1990 | Merry et al. ................. 350/358 |
| 5,082,364 | A | | 1/1992 | Russell ........................... 356/5 |
| 5,118,192 | A | * | 6/1992 | Chen et al. .................. 356/602 |
| 5,125,736 | A | * | 6/1992 | Vaninetti et al. ............. 356/5.1 |
| 5,260,762 | A | | 11/1993 | Telle ............................... 356/5 |
| 5,534,992 | A | | 7/1996 | Takeshima et al. .......... 356/5.1 |
| 5,682,229 | A | * | 10/1997 | Wangler ..................... 356/4.01 |
| 5,710,621 | A | * | 1/1998 | Tamura ...................... 356/5.15 |
| 5,905,576 | A | | 5/1999 | Takada et al. ............... 356/373 |
| 6,271,924 | B1 | * | 8/2001 | Ngoi et al. .................. 356/489 |
| 6,407,818 | B1 | * | 6/2002 | Whitehouse ................. 356/627 |
| 6,485,413 | B1 | * | 11/2002 | Boppart et al. .............. 600/160 |

FOREIGN PATENT DOCUMENTS

| EP | 0 640 846 B1 | 8/1994 | ........... G01S/17/36 |
| WO | WO 92/04596 | 3/1992 | ........... G01C/3/08 |
| WO | WO 95/06852 | 3/1995 | ........... G01C/3/08 |

OTHER PUBLICATIONS

Rogowski, et al., "An amplitude modulated laser system for distance and displacement measurement," SPIE vol. 663, Laser Radar Technology and Applications (1986), pp. 86–89.

* cited by examiner

Primary Examiner—Thomas H. Tarcza
Assistant Examiner—Brian Andrea
(74) Attorney, Agent, or Firm—James S. Tak; Alan H. Thompson; Eddie E. Scott

(57) ABSTRACT

A system and method of efficiently obtaining distance measurements of a target by scanning the target. An optical beam is provided by a light source and modulated by a frequency source. The modulated optical beam is transmitted to an acousto-optical deflector capable of changing the angle of the optical beam in a predetermined manner to produce an output for scanning the target. In operation, reflected or diffused light from the target may be received by a detector and transmitted to a controller configured to calculate the distance to the target as well as the measurement uncertainty in calculating the distance to the target.

35 Claims, 3 Drawing Sheets

OPTICAL DISTANCE MEASUREMENT DEVICE AND METHOD THEREOF

CROSS-REFERENCE TO RELATED APPLICATION

This application is a divisional of application Ser. No. 09/801,144 filed on Mar. 6, 2001 entitled "Optical Distance Measurement Device and Method Thereof".

The United States Government has rights in this invention pursuant to Contract No. W-7405-ENG-48 between the United States Department of Energy and the University of California for the operation of Lawrence Livermore National Laboratory.

FIELD OF THE INVENTION

This invention relates to a method and apparatus for obtaining measurements and, more particularly, to a method and apparatus of measuring with increased accuracy.

BACKGROUND OF THE INVENTION

Distance measurement devices usually measure short distances with good accuracy or long distances with poor accuracy. Currently devices that can measure with good accuracy or long range are expensive and complicated. The short range measurement devices (i.e., microns to meters range) are usually mechanical or optical. The mechanical devices measure the distances directly and the optical devices measure optical fringes to count the distance to the measurement plane. Long distances are measured most commonly by time of flight and result in centimeter scale resolution.

SUMMARY OF THE INVENTION

Aspects of the present invention include a device comprising: a light source capable of transmitting a light beam; a frequency source capable of supplying a modulating frequency to the light source; and an acousto-optical deflector capable of changing the angle of the light beam in a predetermined manner to produce an output.

Another aspect of the present invention includes a method comprising: transmitting a light beam from a light source; modulating the light beam with a frequency signal from a frequency source; and deflecting the light beam by an acousto-optical deflector to produce a deflected light beam.

Another aspect of the present invention includes a system comprising: a first section and a second section configured to have a target placed in between; said first section and said section each having a plurality of sensing devices mounted upon them; and wherein each of said sensing devices operate at different frequencies.

Another aspect of the present invention includes a method comprising: scanning a target from a plurality of sensing devices each operating at different frequencies; wherein each of said sensing devices performs the following steps during scanning: transmit a light beam from a light source; modulate said light beam with a frequency signal from a frequency source; and deflect said light beam by an acousto-optical deflector to produce a deflected light beam.

BRIEF DESCRIPTION OF THE DRAWINGS

The accompanying drawings, which are incorporated into and form a part of the disclosure.

DETAILED DESCRIPTION OF THE INVENTION a. FIG. 1 illustrates a distance measurement system or device 100. The distance measurement device 100 includes a housing 100a having a frequency source 101 (e.g., oscillator) producing a sine wave output and capable of amplitude modulating a light source 102 with a modulation frequency f. The frequency source 101 may operate in the frequency range of approximately 1 MegaHertz (MHz) to approximately 10 GigaHertz (GHz). The light source 102 may typically be a laser diode, but a broadband light source such as incandescent lighting or narrowband light source such as a light-emitting diode (LED) may be used. The amplitude-modulated output from the light source 102 is incident on beam splitter 104. The output 103 of beamsplitter 104 is split into two beams 105 and 107. The splitting of the output 103 creates a ranging beam 105 and a reference beam 107. The ranging beam 105 is transmitted out of the housing 100a to a target 106. A return ranging beam is designated by reference numeral 105a and travels back from the target 106 to the housing 100a. The reference beam 107 is not propagated to the target 106, but rather is redirected in the device 100 by beam splitter 104 so as to be redirected by beam splitter 111 and combined with the return ranging beam 105a. The reference beam 107 optical propagation distance remains constant and thus allows for a constant reference distance to compare the distance to the target 106 that is transversed by return ranging beam 105a. The distance L between the housing 100a and the target 106 is the distance to be measured by the device 100. Return ranging beam 105a returns from the target 106 either by diffuse reflection from the target 106 itself, by a retroreflector 106a, or by another means of returning the light to the detector 110. A retroreflector 106a is a reflection source that may be used to obtain greater accuracy and is typically used when the distance to be measured by the device 100 is greater than approximately 50 feet. Upon returning to the apparatus 100, as discussed above, the return ranging beam 105a is combined at beam splitter 111 with beam 107.

Figure 1:
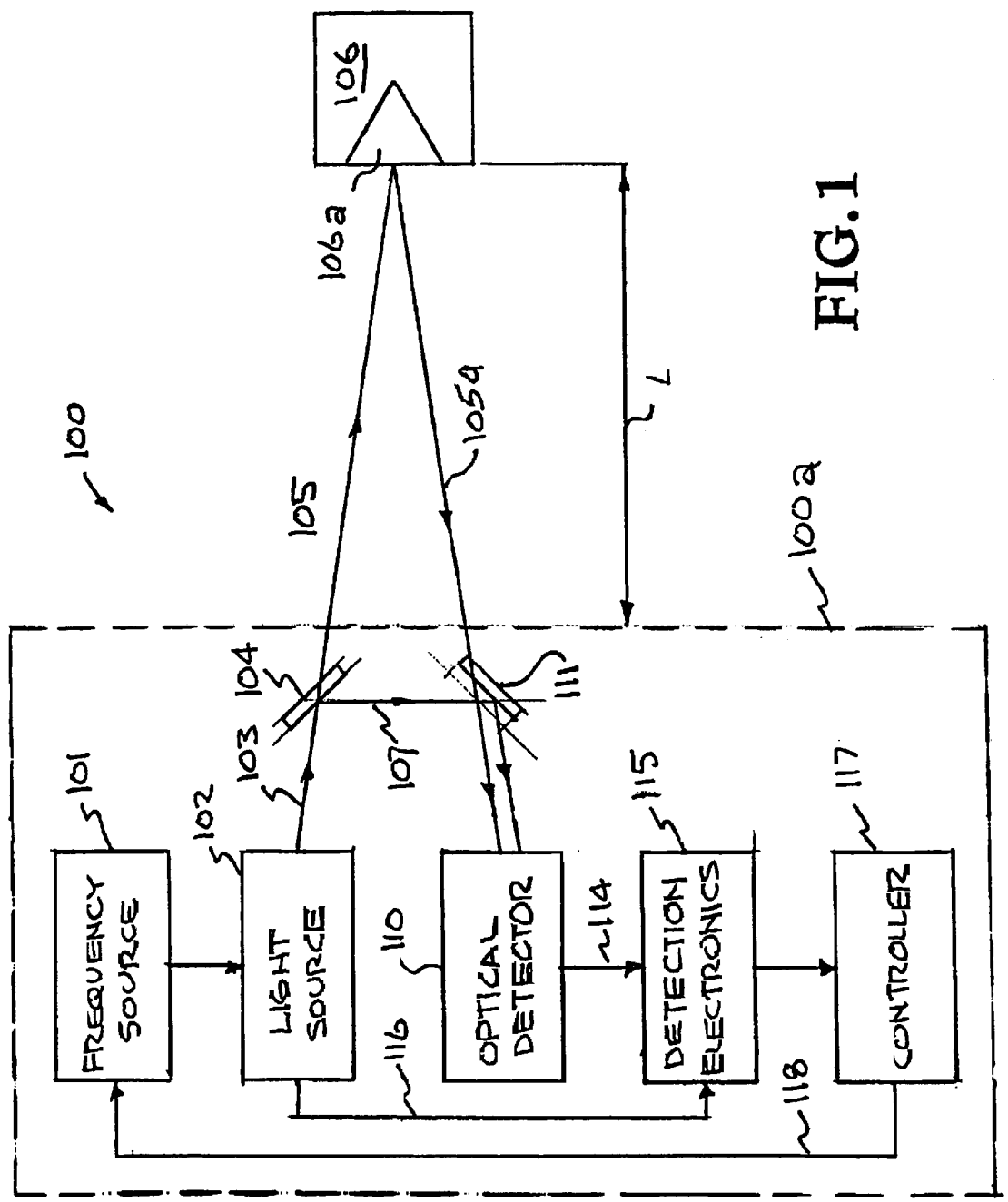
FIG. 1 is a schematic diagram of a first embodiment measurement device having a frequency source which modulates a light source.

The return ranging beam 105a and light beam 107 output from the beam splitter 111 are then incident upon optical detector 110. The optical detector may also be referred to as the first detector for the purposes of this description. The optical detector 110 is a mixing detector which mixes the signals detected from the return ranging beam 105a and reference light beam 107. The optical detector 110 may be a square law detector which outputs a voltage signal proportional to the square of the electric field as a measurement of the optical intensity of the two incoherent beams 105a, 107. Detection electronics 115 are directly coupled to the optical detector 110. Detection electronics 115 may also be referred to as the second detector for the purposes of this description. Detection electronics 115 may include a phase detector and are designed to receive the voltage signal 114 and compare the phase of this voltage signal 114 with the phase of a modulation output signal 116 from light source 102. The detection electronics 115 are then configured to output a phase difference determination to controller 117. The optical detector 110 may be directly coupled to the detection electronics 115 with only an electrical line in between because the voltage signal 114 does not require amplification. Amplification is not required because the detection electronics 115 may be designed to detect minimum frequency values and, therefore, frequency difference signal 114 and modulation output signal 116 are not required to have substantially the same strength. Therefore, the modulation output signal 116 has substantially greater signal strength than the voltage signal 114. The detection electronics 115 are capable of determining the signal strength at the modulation frequency so as to obtain the important information from the optical detector 110 while discarding the unimportant information. After calculating the phase difference between the voltage signal 114 and the modulation output signal 116, the detection electronics 115 the phase difference will be used to determine the distance L. The detection electronics 115 may include, for example, a lock-in amplifier or a band-pass filter.

The controller 117 is configured to receive the phase difference signal from the detection electronics 115 and calculate the one-way distance L from the housing 100a to the target 106. The controller may be, for example, a microprocessor. The controller 117 is connected through line 118 to control the frequency source 101.

The controller 117 is designed to perform the following calculations to determine the distance L to the target 106. The signal power of the voltage signal 114 sent to the detection electronics 115 will be a minimum when the modulation frequency, f, satisfies the following equation:

$$f=(2m+1)c/4L$$

where m is the wave number of modulation waves in the optical path to and from the target 106 (or also defined as the number of cycles between light source 102 and detector 110) and c is the speed of light in a vacuum. The value of m and L are initially unknown, and therefore, a value to be measured may not be determined. The wave number of modulation, m, may be determined by automatically taking at least two readings at two different frequencies. In operation, two readings will be taken automatically upon operation of the device 100, for example purposes, by the operator pushing a button (not shown). The controller 117 is configured to control the frequency settings of the frequency source 101 in response to the operator's actions and to process the first and second readings at different frequencies. The two readings at two different frequencies allows the controller 117 to calculate the value of m using the phase difference signal from detector 115. During a first reading, a first difference signal will be compared to a first modulation output signal, and during a second reading the second difference signal will be compared to a second modulation output signal. The first and second readings may be taken at frequencies in the range of approximately 1 MHz to approximately 2 GHz. More specifically, the measuring frequencies may be digitally controlled frequencies that are controlled by the controller 117 directly or, in alternative embodiments, the frequencies may be obtained from a linear sweep that are read by the controller 117. Putting the value of m into the following equation yields the value of L and $\Delta L$, a measure of uncertainty in the measured distance:

$$L=(2m+1)c/4f$$

$$\Delta L = \frac{-(2m+1)c\Delta f}{4f^2}$$

where f may be the frequency for either of the first or second readings and $\Delta f$ is the uncertainty in the modulating frequency. (For greater accuracy in the measurement of L, a third reading may be taken at a third frequency. This third minimum allows for the averaging of noise in the system and improves the accuracy of the distance measurement).

In an alternative embodiment, the velocity of the object 106 at the distance L may also be measured by analyzing a Doppler shift in the detection electronics 115. The detection electronics 115 are constructed to perform this Doppler shift analysis using voltage signal 114. Since the return signal frequency is Doppler shifted in proportion to the velocity of the target 106, the output of the optical detector 110 will be shifted from the original frequency by this Doppler shift. The detection electronics 115 may detect this shift using standard frequency measurement techniques. The velocity of the object 106 will be proportional to this frequency shift. The velocity calculation may be done simultaneously with the distance measurement.

An advantage of the embodiment disclosed in FIG. 1 is that inexpensive optical components may be used to measure distances with greater accuracy than is normally found in commercial surveying equipment and at substantially lower cost. Specifically, measurements may be obtained by the device 100 with an accuracy in the range of approximately 10 micrometers ($\mu$m) to approximately 100 $\mu$m at approximately 5 meters from the target 106 and the accuracy varying by approximately 1 micrometer per meter as measured to the target 106. Therefore, this embodiment may be used effectively in the range of approximately 1 millimeter (mm) to approximately 5 kilometers.

Figure 2:
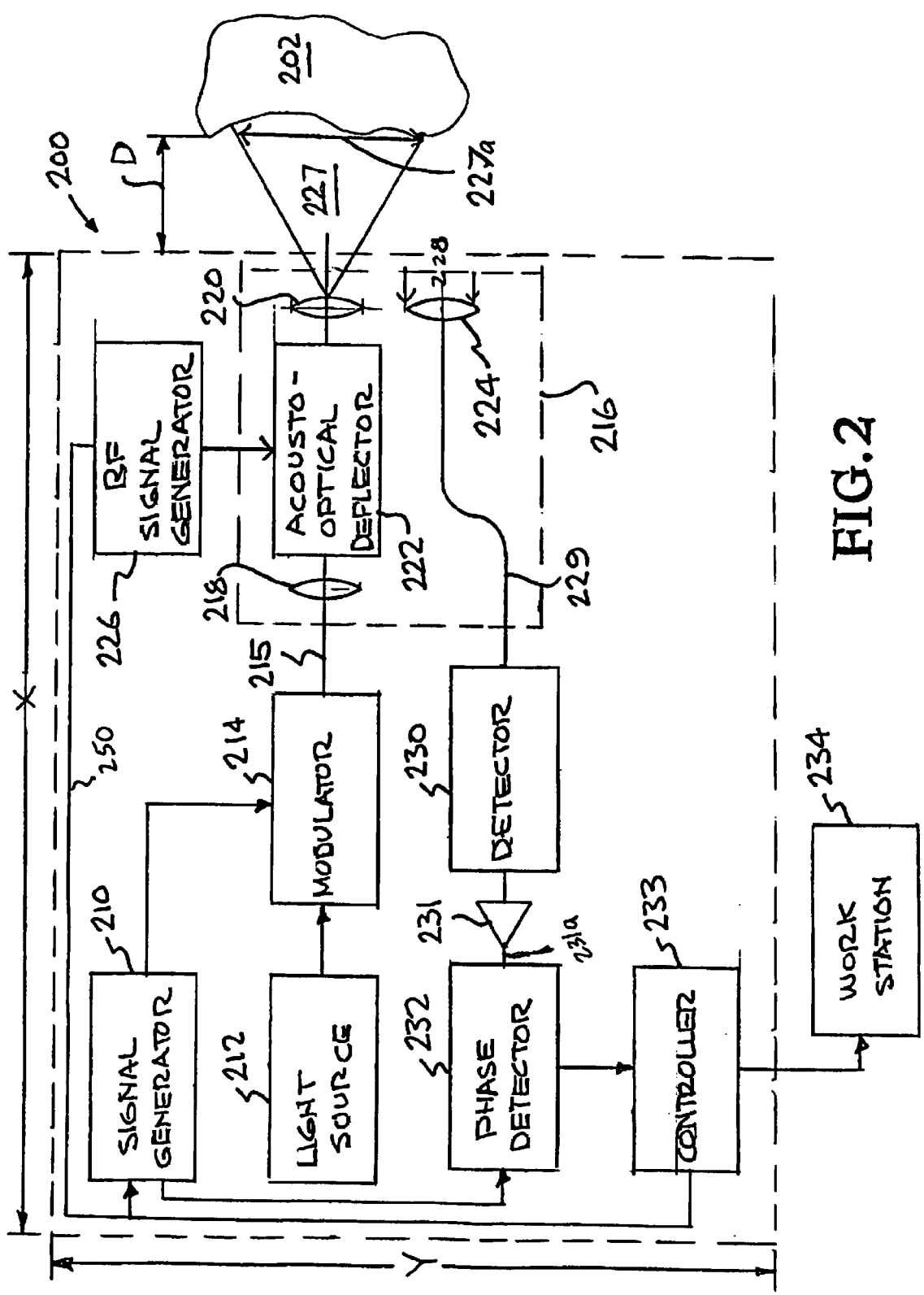
FIG. 2 is a schematic diagram of a second embodiment measurement device.

FIG. 2 illustrates a second embodiment of a measurement device 200 which may determine the distance D to an object or target 202. The device 200 may be designed to be a small package having a length X which may be less than approximately 5 centimeters (cm), height Y which may be less than approximately 2 cm and depth (not shown) which may be less than approximately 2 cm. A light source (e.g., laser diode, LED, incandescent light) 212 either coherent (i.e., light waves all in phase with one another) or incoherent may be modulated in external modulator 214 by a signal generator (or frequency source) 210 (e.g., oscillator). In an alternative embodiment, the light output from light source 212 may be directly modulated without the use of an external modulator 214. Modulator 214 may be, for example, from the group consisting of an acousto-optical (AO) modulator, electro-optical (EO) modulator, Mach-Zender modulator, peizoelectric switch, and a liquid crystal light valve. In operation, a periodic signal (e.g., sine wave, pulsed format) from signal generator 210 modulates the light beam from the light source 212 in the modulator 214. The periodic signal may be approximately 2 GHz or greater. The modulated light beam may then be transmitted through a fiber optic cable 215 to a remote head assembly 216.

The remote head assembly 216 includes beam shaping optics 218, an acousto-optical (AO) deflector 222, beam shaping optics 220 and a receiving lens 224. Radio frequency (RF) signal generator 226 may optionally be mounted inside or outside the remote head assembly. The first set of beam shaping optics 218 focus the light signal from the fiber optic cable 215 onto the AO deflector 222. The AO deflector 222 may contain a crystal and a piezoelectric transducer. The AO deflector 222 may be actuated by the voltage controlled or digitally controlled radio frequency (RF) signal generator 226 (e.g., oscillator) coupled to the AO deflector 222. The RF signal generator 226 may operate in the range of approximately 1 MHz to approximately 10 GHz and while shown outside the remote head assembly 216, the RF signal generator 226 may also be mounted inside the remote head assembly 216. The AO deflector 222 is constructed to diffract light transmitted from the first beam shaping optics 218 off of the sine wave diffraction grating. This diffraction by the AO deflector 222 controls the light and causes the light to shift to a predetermined angle proportional to the driving frequency produced by the RF signal generator 226. The controller 233 may be used to control the RF signal generator 226 frequency (connection shown by reference numeral 250 in FIG. 2). The diffracted light is transmitted to the second beam shaping optics 220 and a light beam 227 is created which forms a light spot 227a on the target 202 and follows a predetermined pattern as it scans the target 202.

The reflected or diffused light 228 from the object 202 is captured by a receiving lens 224 (which also may be a fiber) and transmitted through a fiber optic cable 229 to a detector 230. Detector 230 may be a fast detector (e.g., capable of detecting signals approximately less than 2 nanoseconds in frequency).

The output of the fast detector 230 is then amplified in amplifier 231. The output of this amplifier 231 is kept at a constant level for frequencies that are low compared to the original modulation frequency produced by the signal generator 210. This may be accomplished by using an automatic gain controlled amplifier with feedback from the output signal 231a or by controlling the transmit output level using feedback from the amplifier 231. The amplified output 231a of the amplifier 231 is transmitted to a phase detector 232 as a RF input. A second input to the phase detector 232 is a signal from the original modulating signal source, signal generator 210, is used as a reference signal by the phase detector 232. The output of the phase detector 232 is transmitted to a controller 233. Controller 233 may be a microprocessor or circuitry configured to control the frequency setting of the signal generator 210, receive readings from the phase detector 232 and perform calculations to determine the one-way distance D. Controller 233 may also be connected to a workstation 234 to display the distance measurements. In alternative embodiments, the controller 233 may be removed and the workstation 234 may be used to control the device 200.

In operation, phase detector 232 measures the phase shift of the output signal 231a with respect to the reference signal produced by signal generator 210 and forwards the result to controller 233. The distance D may be calculated in the controller 233. The equations used in determining the distance D and the measure of uncertainty in the measured distance ΔD are the following:

$$D = \frac{c(\phi + 2\pi m)}{4\pi f}$$

$$\Delta D = \frac{c\Delta\phi}{4\pi f} + \frac{c(\phi + 2\pi m)\Delta f}{4\pi f^2}$$

where φ is the phase difference between the output signal 231a and the reference signal from signal generator 210; Δφ is the uncertainty in the phase difference; and Δf is the uncertainty in the modulation frequency. As discussed previously with reference to FIG. 1, m may be determined by taking at least two readings at difference frequencies and then using this information to determine the distance D.

In operation, the light spot 227a from the light beam 227 may be scanned around on the object 202 in a one-dimensional or two-dimensional pattern depending on the specific application. This one-dimensional and two-dimensional scanning capability allows for full three-dimensional object profiling of the target 202. The device 200 may be configured to scan in at least two directions which are substantially perpendicular allowing for an area scan without moving the object 202.

For example, the light spot 227a from the light beam 227 may be used to conduct both substantially transverse measurement and substantially vertical measurement. The substantially transverse measurement direction may be defined as that direction that is approximately perpendicular to the optical propagation direction of light beam 227. The substantially vertical measurement direction may be defined as that direction that is approximately parallel to the optical propagation direction of the light beam 227. In alternative embodiment, the target 202 may also be translated in any direction (e.g., substantially horizontal, substantially vertical) with respect to the light beam 228 or rotated to facilitate the scanning process.

The device 200 may be used to measure the distance to each measured point on the target 202 with an accuracy of less than approximately 1 $\mu$m and, typically, less than approximately 100 nanometers (nm). The transverse measurement accuracy is determined by the spot size 227a and is nominally in the range of 1 $\mu$m to 1 mm. In operation, a linear scan of over approximately 5 to approximately 15 centimeters (cm) per detector 200 and, typically, approximately 8 cm per detector may be possible.

The device 200 may be self-calibrated using symmetrical detectors. Two optical detectors 200 may be used to measure the distance between each other by pointing the two at each other. Then a thin, well-calibrated target 202 may be placed in between the two detectors 200. The exact position and thickness of this target 202 may be calculated and verified with these measurements. Then all other targets 202 placed inside the measurement area will be measured to the same calibration accuracy as was made in the previous measurements.

Figure 3:
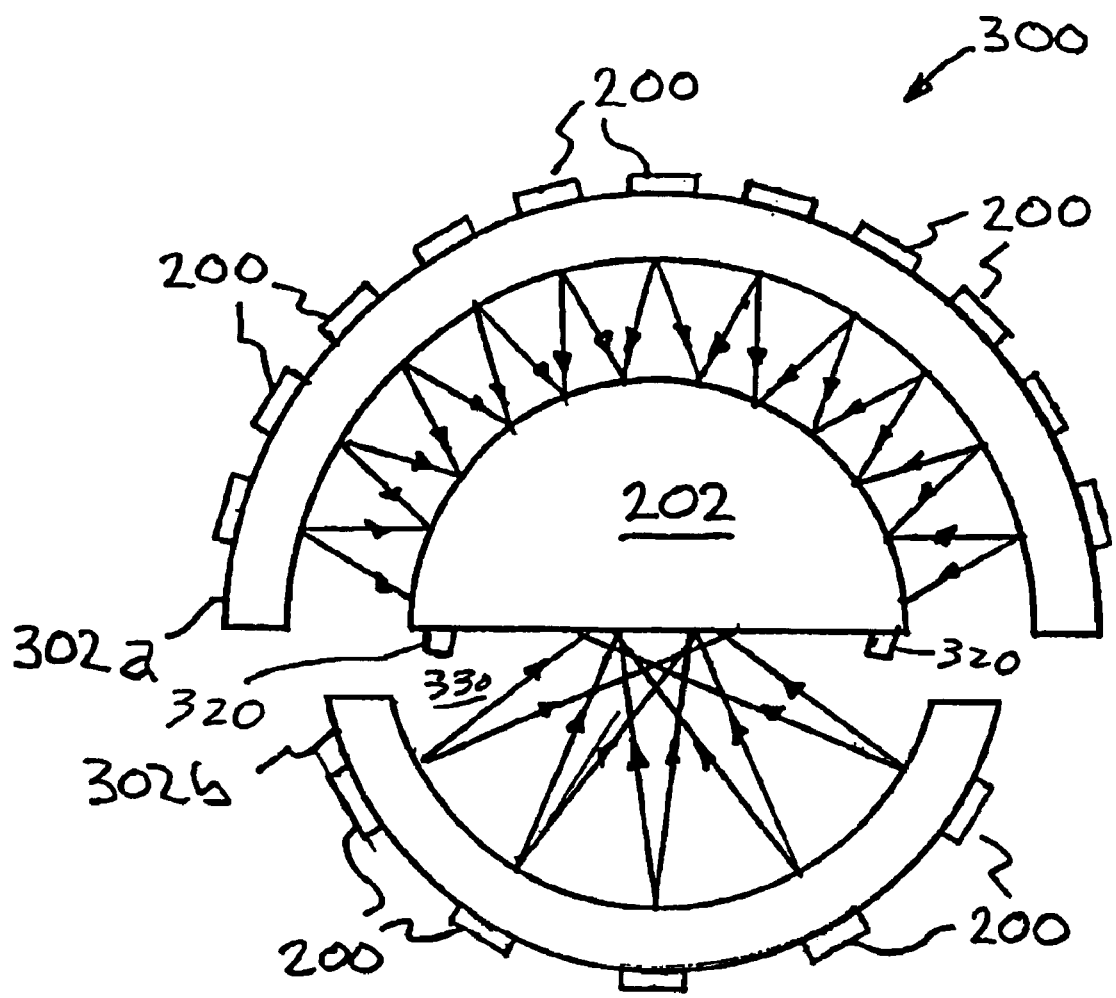
FIG. 3 is a cross-sectional diagram of a modular system incorporating a plurality of the second embodiment measurement devices.

Since the device 200 is modular in format it is possible to combine a plurality of devices 200 into one modular system 300 that may scan many positions of the target 202 mounted in a target chamber 330 as shown in FIG. 3. The modular system 200 design allows for a plurality of devices 200 to be operated simultaneously to improve the speed of measurement. A plurality of devices 200 may be mounted on an upper mounting section 302a and below the target 202 on a lower mounting section 302b. The number of devices on each of the mounting sections 302a, 302b may range in number from one on each mounting section to at least ten on each mounting section. Each of the mounting sections 302a, 302b may have a substantially arcuate shape as shown by FIG. 3. Each of the modulation frequencies of the devices 200 may be different to avoid crosstalk between the devices 200 and allow for simultaneous operation. The target 202 may be rotated on a mounting device 320 or the upper and lower sections 302a, 302b may be rotated together or separately to increase the speed of the scanning operation. Each device 200 may measure areas of up to and including approximately 5 cm by 5 cm of the target 202 with substantially transverse measurement accuracies less than approximately 50 $\mu$m and substantially vertical measurement accuracies of less than approximately 500 nm.

The measuring device 200 disclosed herein may be used in measuring small parts accurately (e.g., parts less than approximately 1 mm). Examples include computer disk parts, electrical assemblies, microchip inspection, circuit board inspection and general factory line inspection that require tight tolerances. However, the measuring device 200 is not limited to small size applications, and may be used in large automotive parts, industrial machinery, building inspection, Amplitude Modulated Light Detection and Ranging (AM LIDAR), distance measurement, modulated optical distance measurement, and survey instruments.

The foregoing is illustrative of the present invention and is not to be construed as limiting thereof. The invention is defined by the following claims, with equivalents of the claims to be included therein.

I claim:

1. A device comprising:

a light source capable of transmitting a light beam;

a frequency source capable of supplying a modulating frequency to said light source;

an acousto-optical deflector capable of changing the angle of the light beam in a predetermined manner to produce an output;

an RF signal generator capable of controlling the acousto-optical deflector to scan a target with the output:

receiving optics capable of receiving reflected light from said scanned target;

a first detector capable of receiving light from said receiving optics and producing a voltage signal associated therewith;

a phase detector capable of receiving the voltage signal from said first detector and a reference signal from said frequency source, and determining a phase difference therebetween; and a controller operatively connected to said phase detector and said RF signal generator and capable of determining the distance to said target using the phase difference calculated for at least two different modulation frequencies.

2. The device of claim 1, wherein said RF signal generator operates in the frequency range of between approximately 1 MHz to approximately 10 GHz.

3. The device of claim 1, further comprising:

a first beam shaping and forming optics capable of focusing said light beam from said light source on said acousto-optical deflector; and a second beam shaping and forming optics capable of receiving said output from said acousto-optical deflector and focusing the output on said target.

4. The device of claim 1, further comprising:

a first fiber optic cable connected between said light source and said acousto-optical deflector.

5. The device of claim 1, further comprising:

a second fiber optic cable connected between said receiving optics and said first detector.

6. The device of claim 1, wherein said controller is configured to calculate the distance to the target and the measurement uncertainty in calculating the distance to the target.

7. The device of claim 1, wherein said controller is configured to control said RF signal generator and said acousto-optical deflector to perform one dimensional scanning of said target.

8. The device of claim 1, wherein said controller is configured to control said RF signal generator and said acousto-optical deflector to perform two dimensional scanning of said target.

9. The device of claim 8, wherein said controller is configured to use information obtained from the two-dimensional scanning to obtain a three dimensional profile of said target.

10. The device of claim 1, wherein the distance to the target may be measured with an accuracy in the range of approximately 100 nm to approximately 1 $\mu$m.

11. The device of claim 1, wherein said acousto-optical deflector includes a crystal and a piezoelectrical transducer.

12. The device of claim 1, further comprising:

a modulator capable of modulating the light beam from said light source using an input from said frequency source.

13. The device of claim 1, further comprising:

a housing having a length less than approximately 5 cm.

14. The device of claim 13, wherein said housing has a height of less than approximately 2 cm.

15. The device of claim 14, wherein said housing has a depth of less than approximately 2 cm.

16. A method comprising:

transmitting a light beam from a light source;

modulating said light beam with a frequency signal from a frequency source;

deflecting said light beam by an acousto-optical deflector to produce a deflected light beams;

controlling said acousto-optical deflector with a frequency signal from a RF signal generator to scan a target with said deflected light beam;

receiving reflected light from said scanned target at a first detector to produce a voltage signal associated therewith;

determining using a phase detector a phase difference between the voltage signal and a reference signal received from said frequency source; and determining the distance to said target using the phase difference calculated for at least two different modulation frequencies.

17. The method of claim 16, further comprising:

scanning a target using said deflected light beam in a one-dimensional pattern.

18. The method of claim 16, further comprising:

scanning a target using said deflected light beam in a two-dimensional pattern.

19. The method of claim 16, further comprising:

scanning a target using said deflected light beam to perform both a substantially transverse measurement and substantially vertical measurement.

20. A system comprising:

a first section and a second section configured to have a target placed in between;

said first section and said second section each having a plurality of sensing devices mounted upon them; and wherein each of said sensing devices operate at different modulation frequencies with respect to each other to modulate light transmitted to said target, and wherein each of said sensing devices is adapted to calculate distance to said target using a phase difference between a voltage signal derived from a return ranging light from said target and a reference signal of the corresponding modulation frequency, for at least two different modulation frequencies.

21. The system of claim 20, wherein each of said sensing devices comprise:

a light source capable of transmitting a light beam;

a frequency source capable of supplying a modulating frequency to said light source;

an acousto-optical deflector capable of changing the angle of the light beam in a predetermined manner to produce an outputs;

an RF signal generator capable of controlling the acousto-optical deflector to scan a target with the output;

receiving optics capable of receiving reflected light from said scanned target;

a first detector capable of receiving light from said receiving optics and producing a voltage signal associated therewith;

a phase detector capable of receiving the voltage signal from said first detector and a reference signal from said frequency source, and determining a phase difference therebetween; and a controller operatively connected to said phase detector and said RE signal generator and capable of determining the distance to said target using the phase difference calculated for at least two different modulation frequencies.

22. The system of claim 21,
wherein each of said sensing devices is adapted to measure areas of up to and including approximately 5 cm by 5 cm of the target.

23. The system of claim 22,
wherein said sensing devices are each capable of performing substantially transverse measurements with accuracies less than approximately 50 $\mu$m and substantially vertical measurements with accuracies of less than approximately 500 nm.

24. The system of claim 20,
wherein the plurality of sensing devices are greater than approximately ten on each of the first and second sections.

25. The system of claim 20,
wherein said first and second sections have a substantially arcuate shape.

26. The system of claim 20,
wherein each of said first and second sections is capable of rotating.

27. The system of claim 20, further comprising:
a mounting device that allows the target to rotate.

28. A system comprising:
a plurality of sensing means; and
means for mounting the plurality of sensing means around a target chamber,
wherein each of said sensing means is capable of transmitting a light beam, modulating said light beam at a different modulating frequency with respect to each other, acousto-optically deflecting said light beam according to a corresponding modulating signal to output a deflected light beam, and determining a distance to a target based on reflections from said deflected light beam by using a phase difference between a voltage signal derived from said reflections and a reference signal, for at least two different modulation frequencies.

29. A method comprising:
scanning a target from a plurality of sensing devices each operating at different modulating frequencies with respect to each other;
wherein each of said sensing devices performs the following steps during scanning: transmit a light beam from a light source; modulate said light beam with a frequency signal from a frequency source; deflect said light beam by an acousto-optical deflector to produce a deflected light beam: control said acousto-optical deflector with a frequency signal from a RF signal generator to scan a target with said deflected light beam: receive reflected light from said scanned target at a first detector to produce a voltage signal associated therewith; determine using a phase detector a phase difference between the voltage signal and a reference signal received from said frequency source; and determine the distance to said target using the phase difference calculated for at least two different modulation frequencies.

30. A system comprising:
a first section and a second section configured to have a target placed in between;
said first section and said second section each having a plurality of greater than approximately ten sensing devices mounted thereupon; and
wherein each of said sensing devices operate at different frequencies.

31. The device of claim 1,
wherein the first detector is a square law detector which outputs a voltage signal proportional to the square of the electric field.

32. The method of claim 16,
wherein the first detector is a square law detector producing a voltage signal proportional to the square of the electric field.

33. The system of claim 20,
wherein the voltage signal is derived using a square law detector which outputs a voltage signal proportional to the square of the electric field.

34. The system of 28,
wherein the voltage signal is derived using a square law detector which outputs a voltage signal proportional to the square of the electric field.

35. The method of claim 29
wherein the first detector is a square law detector which produces a voltage signal proportional to the square of the electric field.

* * * * *